Sept. 6, 1966     P. A. SMITH ET AL     3,270,508
ELECTRO-HYDRAULIC SERVO POWER CONTROL SYSTEM
Filed March 17, 1965
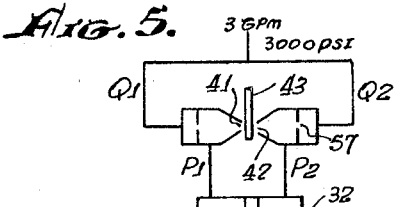
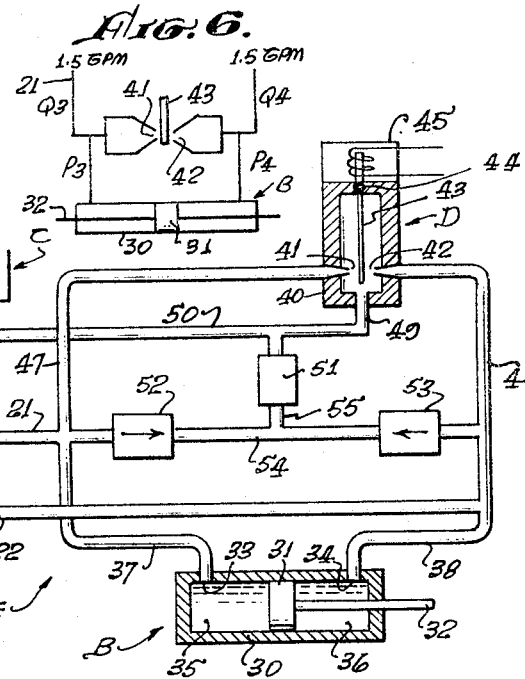
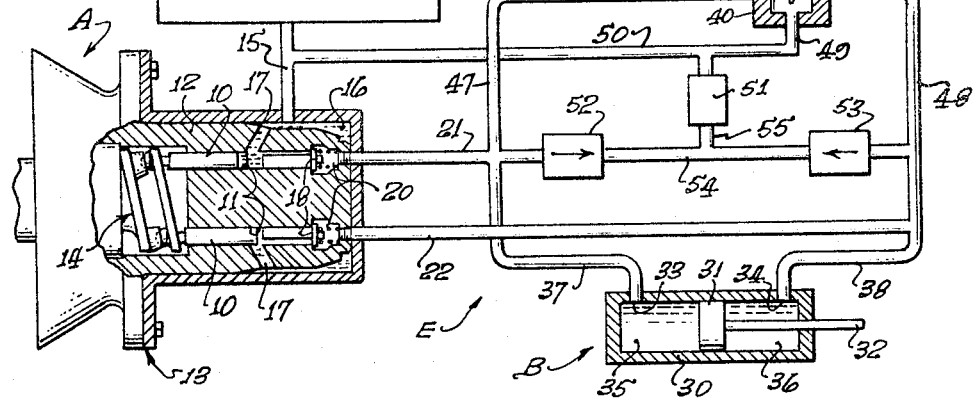
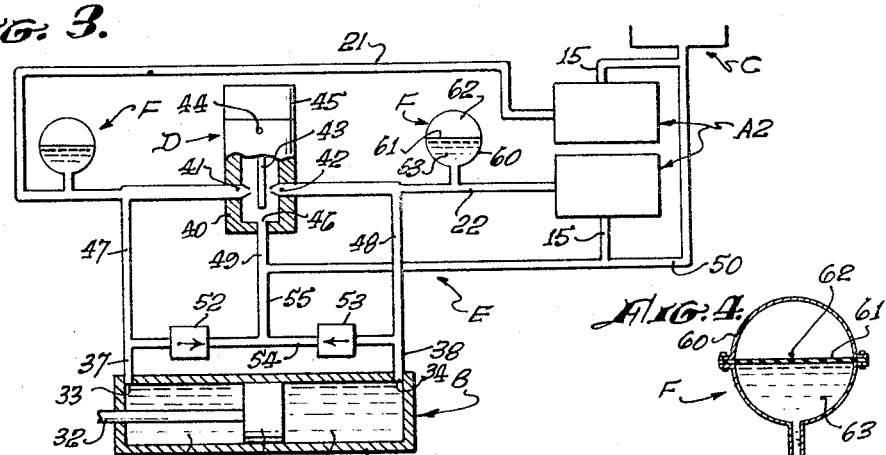
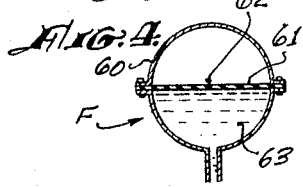
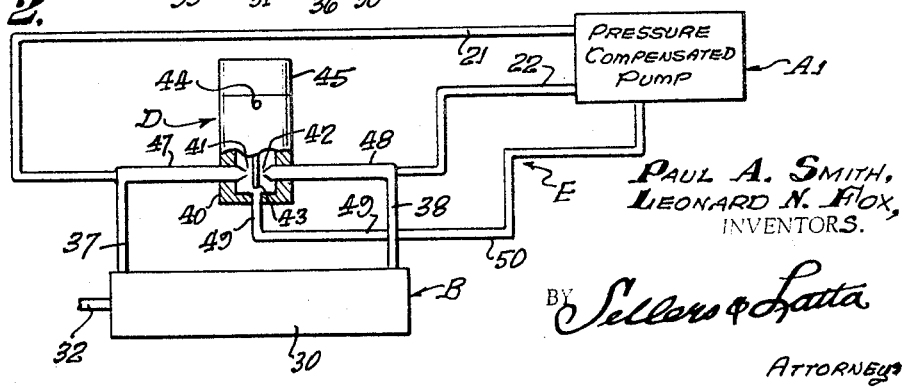
PAUL A. SMITH,
LEONARD N. FOX,
INVENTORS.
BY Sellers & Latta
ATTORNEYS United States Patent Office 3,270,508
Patented Sept. 6, 1966

3,270,508
ELECTRO-HYDRAULIC SERVO POWER CONTROL SYSTEM
Paul A. Smith, Tarzana, and Leonard N. Fox, Glendale, Calif., assignors to Crane Co., doing business as Hydro-Aire Division, Burbank, Calif., a corporation of Illinois
Filed Mar. 17, 1965, Ser. No. 440,480
5 Claims. (Cl. 60—52)

This invention relates to electro-hydraulic systems of the nozzle-flapper type and has as its general object to improve the power control characteristics of such systems.

A conventional electro-hydraulic servo unit of this type (e.g. as utilized for actuating one of the various aerodynamic control members or other hydraulically operated apparatus of an airplane or missile) embodies essentially an actuator (which usually is a double-acting piston within a cylinder having power chambers at both ends thereof); a pump for supplying a pressurized flow of hydraulic liquid to both of these power chambers from a common outlet of the pump; and a remotely controlled hydraulic servo valve including a pair of nozzles having hydraulic pressure-control connections with the respective actuator chambers, and a "flapper" having swinging movement between the opposed nozzles so as to restrict the flow from one nozzle and to thereby increase the pressure transmitted to the corresponding chamber of the actuator, while decreasing the resistance to flow from the opposite nozzle and correspondingly reducing the pressure in the opposite chamber of the actuator; with the end result of creating a differential of hydraulic pressure which causes the actuator piston to assume a new position proportionate to the pressure differential developed between the servo valve nozzles in accordance with the extent of deflection of the flapper. For remote control of the servo valve, it is customary to utilize an electric torque motor, transducer, or equivalent electro-mechanical device for applying variable deflection forces against the flapper in accordance with the signal received from the remote controller of the system.

In the standard electro-hydraulic servo valve arrangement of such systems, the control of normally balanced pressure and flow to the nozzles is provided for by orifices located upstream of the electro-hydraulic servo valve, these orifices being supplied with a common pressurized flow from a common constant high-pressure fluid source, e.g. the single outlet of a pump. In such systems, the input horsepower is required to continually meet both the designed maximum flow and maximum pressure demands of the actuator (which are seldom attained in actuality) and the excess input horsepower thus required represents a waste of energy and a reduction of overall efficiency. The general object of the present invention is to minimize this waste of energy and to improve the efficiency of the system.

The major object and advantage of the invention is to eliminate the necessity for utilizing upstream balanced orifices for providing a normally equalized flow and pressure to the servo valve nozzles, so as to eliminate the horsepower losses resulting from the necessity for operating the input system of such an apparatus at maximum system design flow and pressure.

Various types of high pressure pumps may be utilized to provide the constant high pressure fluid source, and it has been common to utilize, for this purpose, multiple piston pumps, but with all of the pistons delivering to a common outlet. The present invention likewise utilizes a multiple piston pump, and the use of such a pump or a plurality of high-pressure pumping elements is an essential feature of the invention. The invention however, provides a new approach to the problem of reducing energy losses and increasing efficiency, in that it utilizes such a multiple piston pump or equivalent in a modified form wherein separate outlets are provided for the respective pump cylinders or pumping elements, and these outlets are independently connected in equal numbers to the respective power chambers of the hydraulic actuator, whereby the individual pump pistons become the flow control devices and permit the pump to operate in neutral (at a null signal condition) at less than ½ the maximum pressure required in the standard system discussed above, while having the same flow rate as well as maximum output capabilities. Consequently, a 60% or greater reduction in required input horsepower can be realized by the invention over that of the conventional system, and at the same time, the invention provides the ability to meet all of the conventional system operating characteristics during any functional duty cycle.

Pursuant to the foregoing, the invention provides an electro-hydraulic servo power control system wherein:

(1) A multiple piston high pressure hydraulic pump or multiple pumping element high pressure source providing independent discharge flows from its respective pumping elements, is utilized to provide independent pressurized fluid flows to the respective hydraulic chambers of a two-way actuator;

(2) The fluid flows from the respective pump outlets to the respective actuator chambers are isolated from one another;

(3) These isolated fluid flows are independently and directly controlled by the respective nozzles or other control orifices of an electro-hydraulic servo valve, and thereby the upstream orifices of the standard servo system are eliminated;

(4) Pump output flow is maintained constant while output pressure is varied in accordance with system demand;

(5) Flow is related to a constant flow source rather than to a constant pressure source;

(6) The pump output in terms of horsepower need be only sufficient to meet the immediate response demands of the actuator and the output pressure is automatically regulated at just sufficient value to meet the demand at any given instant;

(7) The maximum required horsepower input is only 45% of the input requirement for the old system;

(8) Improved reliability is attained by eliminating the possibility of malfunctioning of the control system by clogging of the control orifices which can occur in the conventional system.

Other objects and advantages will become apparent in the ensuing specification and appended drawing in which:

FIG. 1 is a schematic diagram of an electro-hydraulic servo power system embodying the invention;

FIG. 2 is a schematic diagram of a modified form of the invention;

FIG. 3 is a schematic diagram of another modified form of the invention;

FIG. 4 is a detail sectional view of a modified form of the damping chamber utilized in the system of FIG. 2; and FIGS. 5 and 6 are comparative diagrams of the prior art and the system of this invention.

Referring now to the drawing in detail and in particular to FIG. 1, we have shown therein, as an example of one form in which the invention may be embodied, an electro-hydraulic servo power system comprising, in general, a multiple piston pump A; a two-day hydraulic actuator B of the piston-cylinder type; a reservoir C for supplying hydraulic liquid to the system as required; an electro-hydraulic servo valve D for controlling the pressurized fluid flows from pump A to the respective ends of the actuator B; and a hydraulic circuit including flow lines and valves, indicated collectively and generally at E.

*Pump A* can be of the type disclosed in the pending application, Serial No. 222,113, filed September 12, 1962 in the name of William M. Gibson, for Pressure Compensated Hydraulic Pump, wherein a plurality of pistons 10, operating in respective cylinders 11 in a cylinder block 12 which in turn is mounted within a suitable housing structure 13, are reciprocated by a rotatable swash-plate type of drive-transmission 14 driven by a suitable motor; wherein the hydraulic fluid delivered to the pump through a return line 15 is distributed from an annular chamber 16 through respective inlet ports 17 to the cylinders 11; and wherein the forward stroke of each piston, applying pressure to the fluid in the corresponding cylinder 11, after closing a respective port 17, will drive the fluid past a respective outlet valve 18 (which permits flow only in the pump discharge direction). The pump A is specifically different from the pump shown in the said Gibson patent application in that the outlet chambers or ports 20 which communicate with the discharge ends of the respective valves 18 are isolated from one another and are connected to respective pressure fluid delivery lines 21, 22 connected separately to the respective ends of actuator B. The outlet valves 18 are of the check valve type, permitting flow from the pump cylinders 11 to the outlet ports 20 and checking reverse flow.

The drawing illustrates the pump schematically as having two pistons and two outlets. While it would be possible to utilize a pump having only two pistons, it is contemplated that normally there will be four or more sets of pistons, cylinders and outlets (or other pumping elements) arranged in two groups of two, three or more sets, with the outlet ports 20 (or delivery lines 21) of one group having a common connection to one actuator port through one connecting line, and with the outlet ports or delivery lines 22 of the other group having a common connection through another connecting line to the other port of the actuator. In such a multiple arrangement, the piston cylinder sets will be of an even number to provide a balanced arrangement of pumping units communicating with the connecting lines.

*Hydraulic actuator B* comprises a cylinder 30, a piston 31 sealed therein for reciprocating movement; a suitable piston rod 32 for transmitting actuator movement to a mechanism to be actuated; and ports 33 and 34 in the respective ends of cylinder 30, communicating with respective hydraulic actuator chambers 35, 36 through respective connecting lines 37, 38.

*Electro-hydraulic servo valve D* may be of conventional construction, embodying a suitable housing 40 having aligned, opposed nozzles 41, 42; a "flapper" 43 normally centered between the nozzles 41 and 42 in directly opposed relation thereto so as to restrict either nozzle upon swinging toward the same about a pivot 44 of swinging movement; and an electric torque motor 45 adapted to move the flapper 43 in one direction or the other and with variable torque applied thereto in accordance with a signal received by the motor 45 from a controller. Nozzles 41 and 42 communicate, through respective control lines 47 and 48, with the connecting lines 37, 38 and thus with the respective ends of actuator B. The servo valve D has a return port 46 from which the discharge from the servo valve will be conducted back to the inlet chamber 16 of the pump through a valve outlet line 49 and a return line 50 communicating with the return line 15.

*Reservoir C* is connected to the return line 15 to maintain the system filled with hydraulic fluid, to replenish any leakage that may take place, and to accommodate expansion (thermal etc.).

*The fluid circuit E* includes the various fluid lines 21, 22, 37, 38, 47, 48, 49, 50 and 15 hereinbefore described, and in addition, it preferably includes a system relief valve 51. Delivery lines 21, 22 and control lines 47, 48 are connected to relief valve 51 through a pair of check valves 52, 53, a bridging line 54, and a common connection 55. Any excess pressure in either the line 37, 47 or the line 38, 48 will be relieved through a check valve 52 or 53 to the relief valve 51 and thence to the low pressure return line 50.

*In operation,* the deliveries of pressure fluid from the pump through the respective delivery lines 21, 22, as transmitted through connecting lines 47, 48 will cause respective nozzle discharge flows through the servo valve nozzles 41, 42 into the valve chamber and thence out through its return port 46 and the return lines 49, 50 and 15 back to the inlet chamber 16 of the pump. The discharge flow at each of the nozzles 41, 42 is equal to the individual outputs of the respective pump pistons; and when the command signal to the servo valve D is zero or at null, the respective nozzle discharge will result in equal pressures in the respective hydraulic chambers 35, 36 of the actuator B, no flow will take place through connecting lines 37, 38, and the piston will remain stationary, at a neutral position. The signal current which is fed to the torque motor 45 is directional, resulting in the application of torque to the flapper 43 in one direction or the other so as to displace it toward one of the nozzles 41, 42.

Assuming that the flapper is displaced toward the nozzle 41, it will restrict the escape of fluid through that nozzle while correspondingly permitting a larger flow through the opposite nozzle 42. The restriction at nozzle 41 will effect an increase of pressure and/or flow in connecting lines 47 and 37, thus diverting some of the pump outlet flow from delivery line 21 through connecting line 37 into actuator chamber 35; while at the same time the increase in the flow permitted through nozzle 42, and the corresponding reduction in pressure in lines 38 and 48 will permit all of the pump discharge from delivery line 22 to bypass through connecting line 48 and thence through the valve D and its outlet port 46 to the return lines 49, 50, 15, and a portion of the fluid in actuator 36 will also escape through this same return path, from the connecting line 38, so as to permit the piston 31 to shift toward the chamber 36 in response to the pressure differential thus developed across the actuator B.

The output force at the actuator B will be proportional to the strength of the input command signal to the motor 45 which develops a force on the flapper 43 approximately equal to the pressure differential force generated by the respective nozzle-flow-characteristics, thus providing what is generally referred to as a Pressure-Control Servo System. Thus, by applying commands which give alternate direction to the flapper, the actuator B can be operated selectively in either direction and the magnitude of the system output can be varied in accordance with the strength of the command signal.

The operation of my improved servo system differs from the operation of a conventional electro-hydraulic servo system in that the discharge flows from the pump through delivery lines 21 and 22 do not mix, and consequently the full discharge pressure of the pump, as applied through delivery line 21, together with the full discharge flow from the piston or group of pistons connected to the line 21, will be delivered to the hydraulic chamber 35 of the actuator and to nozzle 41.

In the conventional system with its single pump outlet having a common connection to two delivery lines and wherein there is continually a diversion of flow through the delivery line leading to the open nozzle on one side of the system, and a pressure drop through an upstream orifice in the other delivery line, in order to maintain adequate flow and pressure to the other side of the system for satisfactory operation of the actuator, the pump delivery must be adequate to meet both maximum pressure demand and maximum flow demand. Flow is related to a constant pressure source, whereas in the present invention flow is related to a constant flow source.

Referring now to FIG. 5, showing a diagram of a conventional system, a pump delivery of 3 g.p.m. (3 gallons per minute) at 3000 p.s.i. (pounds per square inch) delivered through fixed orifices 57 to the opposite sides of a servo valve biased by a command signal so as to develop a pressure designated P1, of 1600 p.s.i. at one end of the actuator and a pressure designated P2, of 400 p.s.i. at the other end, with a leakage of 0.2 g.p.m. through the restricted nozzle of the biased valve and a leakage of 2.8 g.p.m. at the open nozzle, would normally be divided between the two delivery lines at approximately the ratio of 1:2, i.e., a flow designated Q1 of 1 g.p.m. to the high pressure side, and a flow, designated Q2, of 2 g.p.m. to the low pressure side. The upstream orifice at the low pressure side would divert one third of the pump delivery to the high pressure side, for useful work in operating the actuator, but the corresponding orifice at the high pressure side would divert two thirds of the pump delivery to the low pressure side and would cause a pressure drop in the high pressure line, both of these effects increasing the demand upon the pump output. A net flow of 0.8 g.p.m. (the difference between the 1 g.p.m. delivery and the 0.2 g.p.m. leakage at the high pressure side) is yielded for movement of the actuator piston under these conditions, the actual piston velocity being .8 g.p.m./piston area.

In the operation of the system of the present invention (FIG. 6) where the same pressure differential across the actuator (1600 p.s.i. at the high side and 400 p.s.i. at the low side) and the same leakage at the valve nozzles (0.2 g.p.m. and 2.8 g.p.m. respectively) are developed, these 1600 and 400 p.s.i. output pressures delivered by the pump will be applied to both delivery lines without pressure loss, each line will receive a flow of 1.5 g.p.m., and the velocity yield will be 1.3 g.p.m./piston area. The flow and pressure losses (and corresponding input power loss) characteristic of the conventional system, are minimized. Maximum pressure requirement for the pump output is reduced from 3000 p.s.i. to 1600 p.s.i. Flow into the high pressure side of the actuator, in the example given, is increased from 0.8 g.p.m. to 1.3 g.p.m., with no diversion of flow from the high pressure to the low pressure side of the system. Maximum pump delivery requirement is thus greatly reduced (for equivalent actuator piston velocity) and need be only enough to meet the maximum piston velocity requirement for the actuator. As the result of these savings, the system of this invention requires only 30% as much horsepower (in the example illustrated by FIG. 6) as that required in a conventional servo system of the same power capacity, and provides a savings up to 60% on operating power required for actuating the prime mover (electric motor, turbine or other engine). Savings may be varied over a range extending to or beyond 70%, depending upon the parameters of the system.

The following comparative values of flow (designated Q1 etc. in FIGS. 5 and 6) to the respective sides of the actuators of the comparative example systems, and of pressures (designated P1 etc.) in (A) the neutral (or balanced) condition of operation and (B) an assumed position of pressure differential responsive condition of operation, will be developed, reference being made to FIGS. 5 and 6; and the following horsepower inputs will be demanded:

|  | Q1 | Q2 | Q3 | Q4 | P1 | P2 | P3 | P4 |
|---|---|---|---|---|---|---|---|---|
| (A) At neutral | 1.5 | 1.5 | 1.5 | 1.5 | 1,000 | 1,000 | 1,000 | 1,000 |
| (B) At assumed position | 1 | 2 | 1.5 | 1.5 | 1,600 | 400 | 1,600 | 400 |

Using the figures given in the above tables (A) and (B), in the equation for determining horsepower (designated H.P.) the following comparative results are obtained:

(C) Horsepower at neutral $$\frac{3 \text{ g.p.m.} \times 3000 \text{ p.s.i.}}{1714} = 5.25 \text{ Case I}$$

Horsepower at neutral $$\frac{3 \text{ g.p.m.} \times 1000 \text{ p.s.i.}}{1714} = 1.75 \text{ Case II}$$

(D) Horsepower at position $$\frac{3 \text{ g.p.m.} \times 3000 \text{ p.s.i.}}{1714} = 5.25 \text{ Case I}$$

Horsepower at position $$\frac{1.5(400) + 1.5(1600)}{1714} = 1.75 \text{ Case II}$$

Extending these figures to determine comparative actuator speed gives the following results:

(E) Fluid available to drive actuator (assuming .2 g.p.m. at nozzle as leakage flow to return) at assumed position—Case I, .8 g.p.m., speed at actuator Case II, 1.3 g.p.m.—for same load is 38.5% greater in case II.

In lieu of the nozzle and flapper type valve described above, the invention may utilize equivalent servo valves of other types, having opposed control orifices and an interposed movable element for differentially restricting the flow from the orifices. Hence the term "control orifice" and "movable element" as used herein is to be understood as being applicable to the nozzles and flapper of the servo valve herein disclosed, or to equivalent elements in the other types of servo valves.

*Modified form—FIG. 2.*—The relief valve arrangement, including the check valves 52 and 53 connecting the respective sides of the system (the lines 47, 48) to the pressure relief valve 51, is optional, being supplied where it is considered desirable to limit the pressure build-up in the system and to avoid excess pressures which might arise from pump speed control failure or possible clogging of a servo valve nozzle. The system is operative without this relief valve arrangement, but would in that event lack the protection against such failures.

FIG. 2 discloses a satisfactory system utilizing a pressure-compensated pump A1 which has a built-in pressure-relief and thus makes it possible to omit the relief valve mechanism. In FIG. 3, the check valves 52, 53 also function as relief valves, and the relief valve 51 is omitted.

*Modified form—FIG. 3.*—It will be apparent that the discharge flow from the pump will be subjected to pressure pulsations from the reciprocating pistons, even though several pistons may be pumping into each of the discharge lines 21 and 22, with the pumping strokes of the pistons equally spaced from one another in time. The ripple thus imparted to the pump discharge is utilized to break loose any mechanical part the movement of which may be impeded by frictional resistance in its bearing; and to eliminate hysteresis in the movements of the parts arising from mechanical and viscous friction in the system. To achieve uniform spacing of the pulsation in each of the isolated discharge circuits, the several pump pistons of one circuit may be arranged alternately between the several pistons of the other pumping circuit, at equi-angular spacing around the axis of the pump.

The system of FIG. 3 is the same as that disclosed in FIG. 1 as indicated by the use of corresponding reference numerals to designate the corresponding parts, with several exceptions, (1) Instead of pump A with separate discharge outlets, a pair of separate pumps or pumping elements A2, each connected to a respective delivery line, are utilized. (2) A pair of damping chambers F are connected to the pump discharge lines 21 and 22 so as to smooth out the ripple in the pressure fluid flow caused by the pulsating action of the pump pistons. The damping chamber F in each instance is disclosed as comprising a housing 60 having an air cushion 62 above a body of liquid 63 in communication with the respective discharge line 21 or 22. The invention also contemplates the possibility of utilizing a damping chamber which is completely oil filled, depending upon the compressibility of the oil for its damping effect. In FIG. 4, the damping chamber housing 60 is divided internally by a horizontal diaphragm 61 which provides an air chamber 62 above it, and is in contact with a body of liquid 63 below it.

We claim:

1. An hydraulic servo power system comprising, in combination: a reversible actuator having movable pressure responsive means and respective power chambers arranged for opposed fluid pressure action against said pressure responsive means; a servo valve having opposed control orifices, a second movable element between said orifices, and a remotely controlled servomotor acting upon said second movable element to vary the restriction of said orifices solely in response to command signals transmitted thereto; multiple pump means having two outlets independently receiving pressure fluid flows pumped by respective pump elements; and mutually isolated fluid delivery lines each connecting a respective pump outlet to a respective power chamber of said actuator and, in parallel, to a respective control orifice of said servo valve, whereby displacement of said second movable element toward one of said control orifices and away from the other will restrict escape of fluid from said one control orifice and correspondingly will increase the fluid pressure in the power chamber connected thereto, while permitting increased flow from said other control orifice and relieving pressure in the other power chamber so as to effect movement of the actuator toward said other power chamber, utilizing the full pressure and flow delivered from a respective pump outlet, said system having a power input requirement less than half that of an hydraulic servo power system of equal output capacity having a common path of flow from pump outlet to both power chambers of a reversible actuator.

2. A servo power system as defined in claim 1, including a pressure-relief return line and parallel connections between said fluid delivery lines and said return line, said connections including check valves for one-way relief flow of excess pressure fluid from said delivery lines to said return line, said return line returning the fluid to said pump means.

3. A servo power system as defined in claim 1, including a return line and parallel connections between said fluid delivery lines and said return line, said connections including respective check valves for one-way relief flow of excess pressure fluid from said delivery lines to said return line, said return line returning the fluid to said pump means and including therein a pressure-relief valve relieving any excess pressure applied to either of said check valves.

4. An electro-hydraulic servo power system comprising, in combination: a two-way actuator including a cylinder and a piston movable therein, said cylinder having respective power chambers on respective sides of said piston; a multiple-piston pump having two separate outlets for respective pistons thereof; a servo valve including opposed control orifices, a fluid-return outlet, a movable element between said orifices, and an electric servomotor in response to electric control signals as the sole means for displacing said movable element to variable spacing from said orifices to variably restrict escape of fluid therefrom; and a pair of fluid lines each providing a direct connection in parallel from a respective pump outlet to a respective chamber of said actuator and to a respective control orifice of said servo valve and delivering the discharge pressure and flow of the respective pump outlet to the respective actuator chamber and valve orifice, said system having a power input requirement less than half that of an hydraulic servo power system of equal output capacity having a common path of flow from pump outlet to both power chambers of a reversible actuator.

5. A system as defined in claim 4, including a return line extending from said valve outlet to the inlet of said pump; and excess pressure relief means connected in parallel between said control orifices and actuator chambers and said return line, said last means comprising a pressure relief valve in said return line, relief flow lines connecting the respective lines of said pair of fluid lines to said return line, and check valves in the respective relief flow lines, providing for one-way flow in said relief flow lines from said pair of fluid lines to said return line in response to any excess pressure developed in either of said pair of fluid lines.

References Cited by the Examiner

UNITED STATES PATENTS

| 2,232,449 | 2/1941 | Habenicht | 60—52 X |
| 2,450,427 | 10/1948 | Halpert | 60—52 |
| 2,548,481 | 4/1951 | Knowler et al. | 60—52 X |
| 2,555,427 | 6/1951 | Trautman | 60—52 X |
| 2,867,976 | 1/1959 | Huber | 60—52 |
| 3,175,354 | 3/1965 | Firth et al. | 60—52 |
| 3,175,508 | 3/1965 | Smithson | 103—2 X |

EDGAR W. GEOGHEGAN, *Primary Examiner.*